United States Patent [19]
Pfalzgraf

[11] Patent Number: 5,011,346
[45] Date of Patent: Apr. 30, 1991

[54] MOUNTING DEVICE WITH CONICAL SHANK

[75] Inventor: Emile Pfalzgraf, Bouxwiller, France

[73] Assignee: E.P.B. Emile Pfalzgraf, Societe Anonyme, Bouxwiller, France

[21] Appl. No.: 486,876

[22] Filed: Feb. 20, 1990

[30] Foreign Application Priority Data

Jan. 23, 1990 [FR] France ................... 90 00901

[51] Int. Cl.$^5$ ............... B23C 9/00; B23B 31/10
[52] U.S. Cl. ..................... 409/234; 279/75; 408/239 R
[58] Field of Search ............ 409/232, 233, 234; 408/239 R, 239 A; 279/30, 22, 75

[56] References Cited

U.S. PATENT DOCUMENTS

| | | | |
|---|---|---|---|
| 3,895,881 | 7/1975 | Langlois | 408/239 X |
| 4,238,167 | 12/1980 | Brugger et al. | 409/232 |
| 4,309,042 | 1/1981 | Fauth et al. | 279/75 |
| 4,548,532 | 10/1985 | Watanabe et al. | 409/233 |
| 4,680,999 | 7/1987 | Kojima et al. | 409/233 |
| 4,759,686 | 7/1988 | Kirst | 279/75 |
| 4,784,536 | 11/1988 | Pfalzgraf | 408/239 A |
| 4,822,220 | 4/1989 | Danielsson et al. | 409/233 |
| 4,840,520 | 6/1989 | Pfalzgraf | 409/232 |
| 4,886,402 | 12/1989 | Pfalzgraf | 409/234 |

FOREIGN PATENT DOCUMENTS 1068473 6/1954 France ................... 279/30

*Primary Examiner*—William Briggs
*Attorney, Agent, or Firm*—Young & Thompson

[57] ABSTRACT

The present invention concerns a mounting device with conical shank, particularly a 7/24ths cone, for cone-to-surface application for attachments, toolholders and tools, essentially constituted by a cone (1) for mounting in a spindle (2), by a front part (3) centered in the cone (1) and provided with a flange (4) for application via its rear face against the front face of the spindle (2), and by a knob (5) for assembly of the cone (1) and the front part (3) by means of an intermediate threaded element (6), on which bears an elastic unit (7) formed of Belleville washers intended to apply the cone (1) in the spindle (2) in locking position and mounted in compression between the said cone (1) and the front part (3), characterized in that it is provided with a device (8) for locking of the mutual position of the cone (1) and the front part (3), in mounting position in the spindle (2) with application of the flange (4) against the face of the said spindle (2), by gripping at least two balls (9) between the said cone (1) and front part (3).

13 Claims, 4 Drawing Sheets

MOUNTING DEVICE WITH CONICAL SHANK

The present invention concerns the field of machine tool accessories, with numeric control, for machining centers, flexible cells and manufacturing systems, and has as an object a mounting device with conical shank, particularly a 7/24ths cone, for cone-to-surface use for attachments, tool carriers and tools.

At present, the fastening or mounting of a tool attachment or of toolings in the spindles of milling, boring, numeric control machines, of machining centers or flexible cells and manufacturing systems, is generally achieved by means of conical shanks whose most current taper is 7/24ths. These mountings and fastenings were satisfactory up to now and still are for some operations.

The accession of machining centers with 7/24th taper, most of the time exhibiting a truncated back and a special flange for automatic changing of the tools, has led to modification of the conventional 7/24ths cone with a simple flange and back thread for fastening with threaded bolt.

The majority of machine spindles now made are provided for mounting of tools having a 7/24ths cone and flanges corresponding to the usual standards, there still being some machines with flanges quite specific to certain manufacturers.

The known type of fastening, described above, is still satisfactory for some applications, but because of the increase in power and considerable performance of machines and tooling centers, as well as very considerable developments made in inserts and cutting tools, fastening of the cones in the spindles is no longer suited to the progress made by the machines and the performances of tools and thus constitutes a considerable handicap, the power developed by the machines and the resulting forces able to be absorbed by the tools not being transmissible at the level of the cone.

Specifically, the critical point and the weakness of present fastenings are most often at the spindle output, which is a weakening point for all toolholders or tools, these latter having to meet a specific diameter of the tool, which is the large diameter of the end of the cone connected by a cylindrical portion of slight length to the flange. The same problem also arises, but in a less crucial way, for fastening tools with a 7/24th cone to lathes.

Moreover, it has been proposed to effect fastening of the tools by means of a cylindrical shank with application against the front surface of the spindle. This embodiment certainly makes it possible to solve the problem of perfect contact between the surfaces but requires a modification of the spindles of the machines. In addition, the weight of the tool, significant in certain cases, risks modifying the alignment relative to the axis of the spindle and the positioning of the tool changer must be carried out in extremely close tolerances in all directions, to permit a perfect alignment of the axis of the spindle and the toolholders.

It has also been proposed, in the case where high performance must be achieved, to obtain a simultaneous application of the cone and the surface of the spindle, to make single-piece standard cones by means of dimensions specific to each spindle. However, such an embodiment involves extremely high prices and requires production tolerances that cannot be maintained for series production. In addition, the tools thus obtained are absolutely specific to a given spindle and in no case are interchangeable with the tools intended for other spindles, thus for other machines. This embodiment is therefore valuable only for responding to specific problems.

Moreover, there has also been proposed a mounting device with conical shank, especially a 7/24ths cone, with cone-to-surface application for attachments, toolholders and tools, which is essentially constituted by a cone for introduction in the spindle, by a front part centered in the cone and provided with a flange for application against the face of the spindle, by a knob for assembly of the cone and of the front part, by an elastic pressure unit for the cone in the spindle in locking position, mounted in compression between the cone and the front part, and by a means for adjusting the said pressure unit.

Various devices have also been proposed for overcoming the insufficient gripping and detachment of the surface at the time of using certain devices subjected to very great torques. These devices all have a supplementary gripping means or a means intended to eliminate any play of the assembly tolerances between the cone and the front part, so as to overcome the above-mentioned disadvantages, this means being realized in the form of ball bearing sleeves, gripping elements, deformable elastic means or a bayonet system adapted to lock the two principal cone and front elements constituting the various devices. Nevertheless, because these systems have a single inclination and are always tributary to the weakness of the gripping of the machine, the results obtained are not always sufficient to absorb the power of the machines and the progress of the machinings and tool cuttings.

In addition, hydraulic systems have been proposed operating by inflation of a material, so as to eliminate the assembly play between the cone and the front part. Nevertheless, these systems no longer permit obtaining the desired results.

The present invention has as an object to overcome these disadvantages.

Specifically, it has as an object a mounting device with conical shank, particularly a 7/24ths cone, for cone-to-surface use for attachments, tool carriers and tools, essentially constituted by a cone for mounting in a spindle, by a front part centered in the cone and provided with a flange for application via its rear surface against the front surface of the spindle, and by a knob for assembly of the cone and the front part by means of an intermediate threaded element, on which bears an elastic unit formed of Belleville washers intended to apply the cone and the spindle in locking position and mounted in compression between the said cone and the forward part, characterized in that it is provided with a device for locking the mutual position of the cone and the front part, in mounting position in the spindle with application of the flange against the surface of the said spindle, by gripping at least two balls between the said cone and front part.

The invention will be better understood thanks to the following description, which relates to a preferred embodiment given by way of non-limiting example, and explained with reference to the accompanying schematic drawings, in which.

Figures 4, 5:
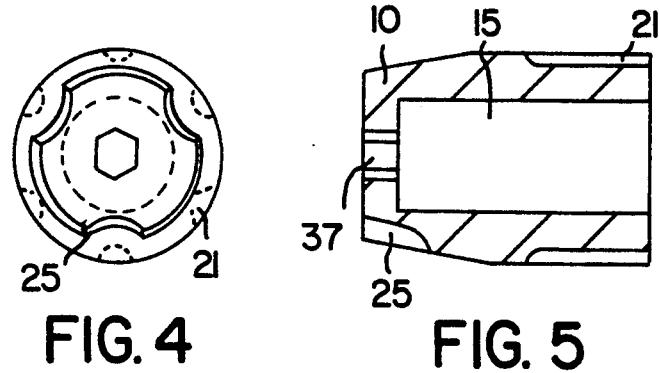
FIGS. 4 and 5 are views in front and side elevation, respectively, and in section of a locking element.
Figure 6:
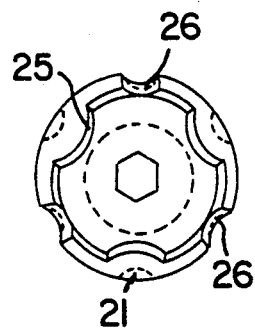
Figure 7:
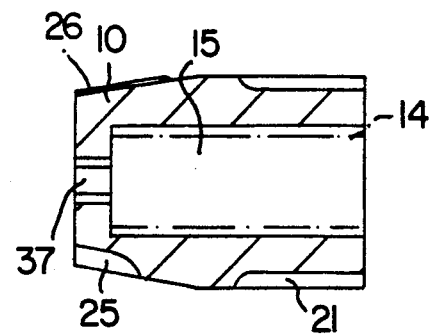
Figure 8:
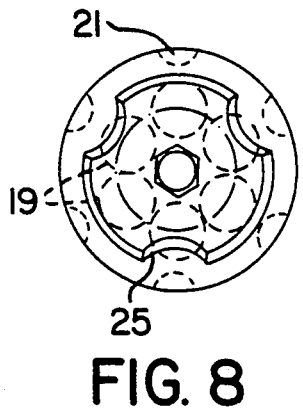
Figure 9:
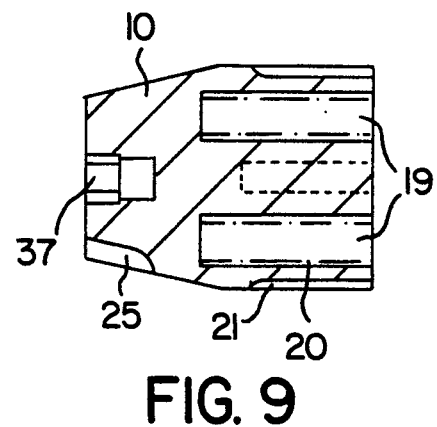
Figure 10:
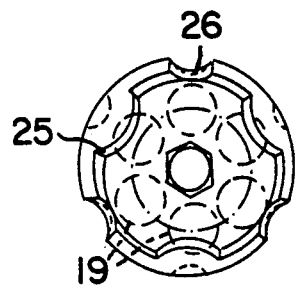
Figure 11:
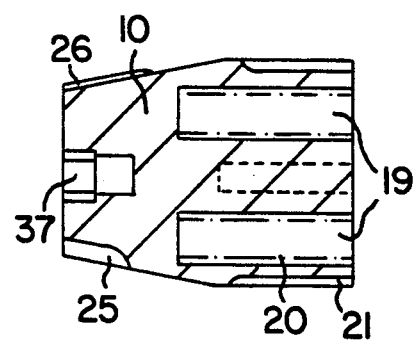
Figure 12:
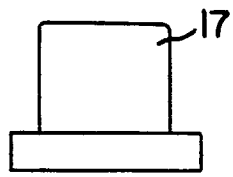
Figure 13:
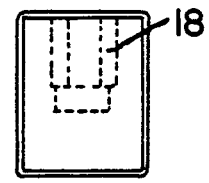
Figure 14:
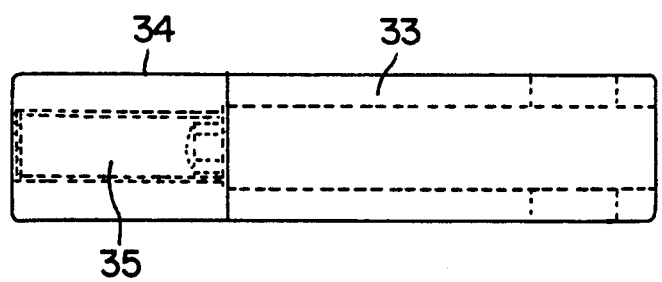
Figure 15:
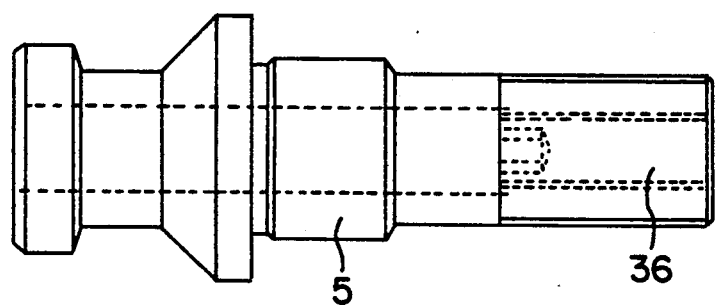

FIGS. 6, 8, 10 and 7, 9, 11, respectively, are views similar to those of FIGS. 4 and 5, respectively, of other embodiments of the locking element;

FIGS. 12 and 13 are views in side elevation of abutments for adjusting pressure;

FIG. 14 is a view in side elevation of a mounting element for the overall device, and FIG. 15 is a view in side elevation of the knob.

Figure 1:
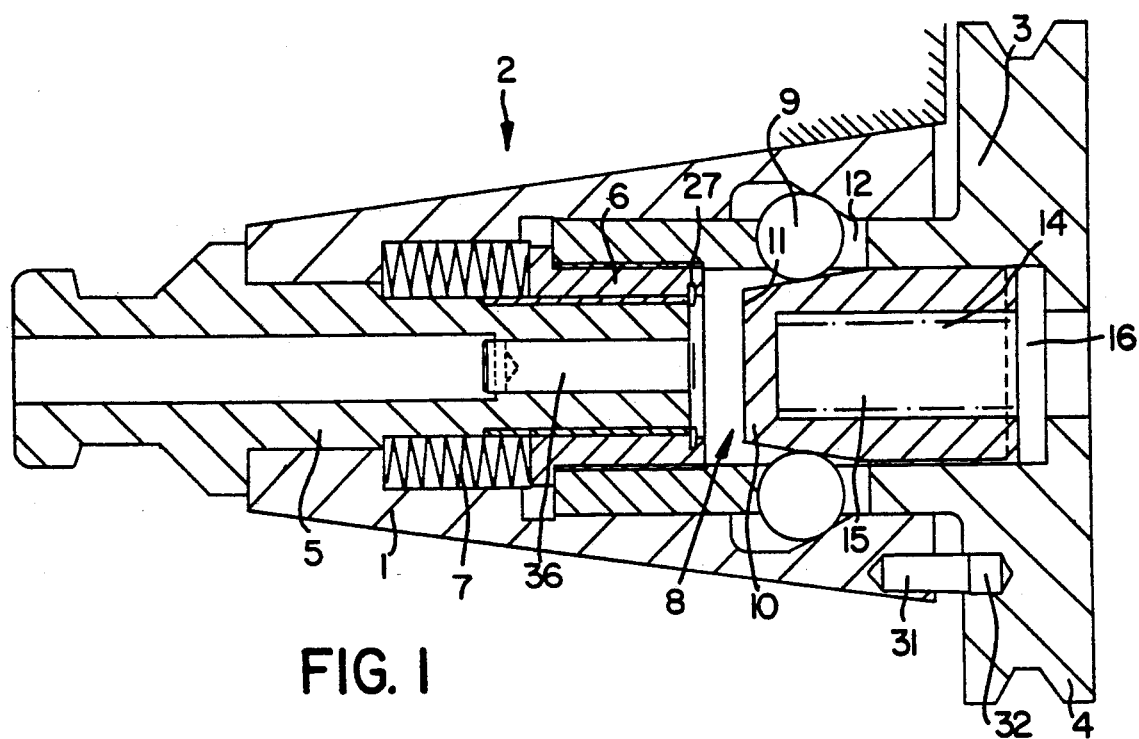
FIG. 1 is a view in side elevation and in section of a device according to the invention.

According to the invention and as is shown more particularly by way of example in FIG. 1 of the accompanying drawings, the mounting device with conical shank, particularly a 7/24ths cone, for cone-to-surface use for attachments, toolholders and tools, essentially constituted by a cone 1 for mounting in a spindle 2, by a front part 3 centered in the cone 1 and provided with a flange 4 for application via its rear face against the front face of the spindle 2, and by a knob 5 for assembly of the cone 1 and the front part 3 by means of an intermediate threaded element 6, on which bears an elastic unit 7 formed of Belleville washers intended to apply the cone 1 in the spindle 2 in locking position and mounted in compression between the said cone and the front part 3, characterized in that it is provided with a device 8 for locking of the mutual position of the cone and the front part 3, in mounting position in the spindle 2 with application of the flange 4 against the face of the said spindle 2, by gripping at least two balls 9 between the said cone 1 and front part 3.

The device 8 for locking of the mutual position of the cone 1 and the front part 3 is advantageously constituted by a cylindrical locking element 10 housed in the front part 3, turned toward the knob 5 and having a frusto-conical portion 11 cooperating with at least two balls 9, preferably with three balls 9, on the side directed toward the knob 5, the said balls 9 being positioned at regular intervals in openings 12 of the front part 3 and cooperating with corresponding housings 13 or a corresponding circular channel (not shown) of the cone 1, the said element 10 being urged by at least one spring 14 disposed in at least one housing 15 of its rear part and maintained in the said housing by means of a closing cover 16 (FIG. 1) or an abutment 17 or 18 (FIGS. 12 and 13) for adjusting the pressure of the spring or springs.

Figure 2:
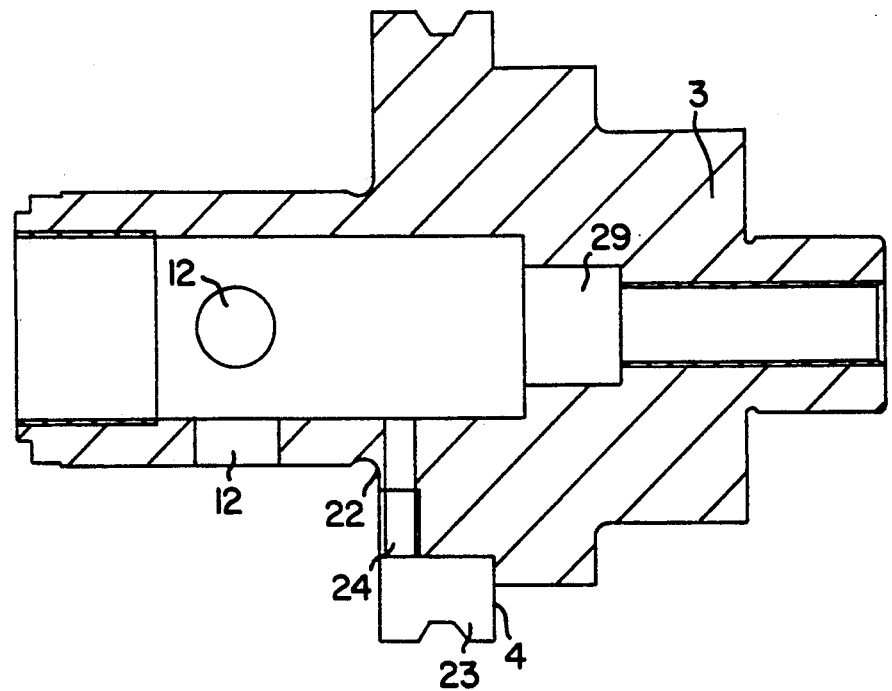
FIG. 2 is a view similar to that of FIG. 1 of a different embodiment of the front part.
Figure 3:
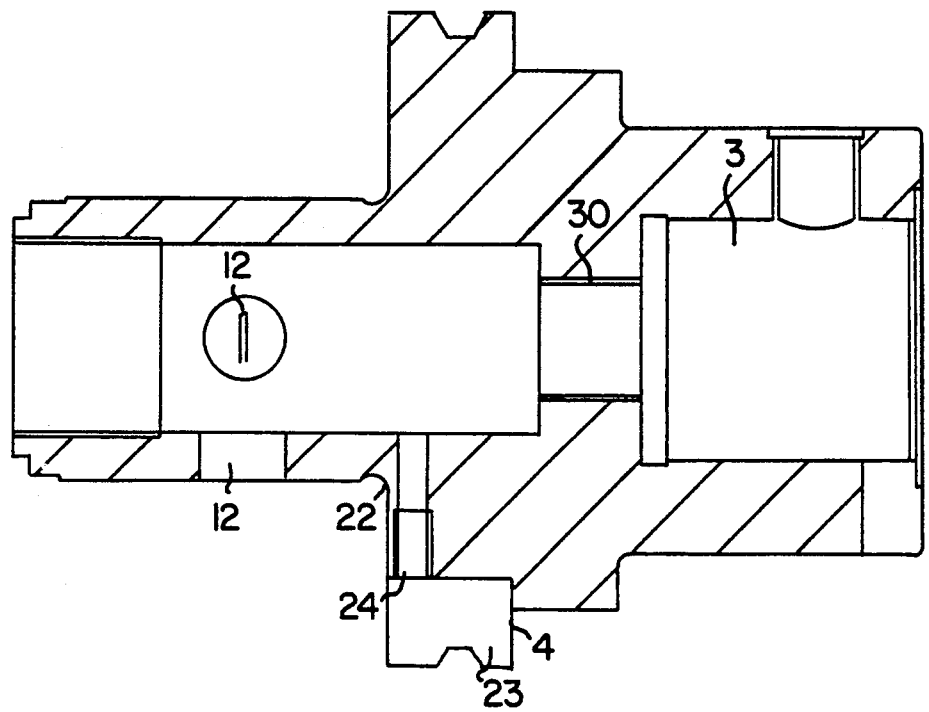
FIG. 3 is a view similar to that of FIG. 2 of another variation of the front part.

The number of balls 9 is not invariable and it is possible to provide more than three balls, the corresponding openings 12 and housings 13 then being of the same number. Thus, according to another characteristic of the invention, the balls 9 may be provided in a large number and cooperate with a corresponding number of housings 13 or with a circular channel of the cone 1. These openings 12 are better seen in FIGS. 2 and 3 of the accompanying drawings, which show other embodiments of the front part 3, which may also comprise, instead of a single centering diameter in the cone as shown in FIGS. 1 to 3, two or more centering diameters, the larger diameter always being situated toward the flange 4.

The locking element 10 is provided with a single housing 15 (FIGS. 4 to 7) for receiving a single spring 14, or several housings 19 formed in a barrel (FIGS. 8-11) for receiving several springs 20.

Moreover, this locking element 10 is provided on the one hand, at regular intervals of preferably 60° over its cylindrical part, with longitudinal indexing grooves 21 intended to cooperate with a ball (not shown) housed in a radial bore 22 of the front part 3, at the level of the flange 4 and in the middle of the groove 23 of this latter and urged by a spring (not shown) whose force is adjusted by means of a screw received in an end threading 24 of the bore 22 (FIGS. 2 and 3) and, on the other hand, on its frusto-conical part 11, at regular intervals of preferably 120°, with recesses 25 for disengaging the balls 9 at the time of assembly of the device (FIGS. 4 to 11).

According to another embodiment of the invention, shown in FIGS. 6, 7, 10 and 11, the frusto-conical part 11 of the locking element 10 may also be provided, at regular intervals preferably between the recesses 25, with longitudinal grooves 26 having a spherical base, the radius of curvature of which is equal to the radius of the balls 9. These grooves 26 permit a stronger application of the balls 9 on the elements 10, at the time of locking of the mutual position of the cone 1 and the front part 3, than in the embodiment according to FIGS. 4, 5, 8 and 9. Specifically, in the first case, the application of the balls is effected along the arc of a circle, whereas in the other case, it is at a point.

According to another characteristic of the invention, the intermediate threaded element 6 is advantageously provided at the end of its internal housing directed toward the locking element 10, with a stopping abutment 27 for the knob 5, in the form of an elastic sleeve penetrating into a circular channel provided at the end of the said housing.

The abutments 17 and 18 for adjusting the pressure of the single spring 14 or multiple springs 20 are intended to be introduced, in the case of the abutment 17, in a housing 28 of the front part 3 for displaceable adjustment by means of a screw cooperating with a tapping 29 of this front part 3, provided on the side opposite the housing of the element 10 (FIG. 2), and in the case of the abutment 18, in a tapping 30 of the front part 3, extending the housing of the element 10 on the side opposite the knob 5 (FIG. 3). In this latter case, the adjustment of the pressure may be effected directly by means of the abutment 18 with a corresponding screwing or unscrewing in the tapping 30.

According to another characteristic of the invention, the cone 1 is provided on its face directed toward the front part 3 with a pin 31 intended to cooperate with a correspondingly shaped housing 32 of the flange 4 of the front part 3 to provide a mutual indexing permitting alignment of the windows 12 of the front part 3 and the corresponding housings 13 of the cone 1. Such an indexing is absolutely necessary to permit a rapid assembly of the cone 1 and the part 3.

Moreover, to promote mounting of the part 3 with the locking device 8 in the cone 1, the device according to the invention is provided with a mounting element 33 (FIG. 14) provided at one end with a threading 34 intended to cooperate with the bore of the intermediate threaded element 6 and housing a screw 35 for actuating the locking element 10. The operation of this element 33 will be explained below.

Finally, according to another characteristic of the invention, the knob 5 is a hollow knob provided at its end screwed into the threaded element 6 with an interior manipulating screw (FIGS. 1 and 15). Such a screw 36 is more particularly intended to permit an unlocking of the assembly between the cone 1 and the front part 3.

On the other hand, as shown in FIGS. 4 to 11, the locking element 10 is advantageously provided on its face directed toward the knob 5 with a polygonal manipulating recess 37. Such a recess is intended to receive a key of corresponding shape permitting rotation of the element 10 to effect indexing in an actuating position of the balls 9.

Finally, according to another embodiment of the invention, not shown in the accompanying drawings, it is also possible in certain cases to eliminate the intermediary element 6, the knob 5 then having a greater diameter and being screwed directly in the bore of the element 3, the diameter of which is then smaller, the assembly 8 having an exterior diameter corresponding to that of the bore of the element 3 and the balls 9 having a greater diameter.

The device according to the invention is assembled in the following manner:

A front element 3 according to FIG. 2 is provided with an abutment 17 according to FIG. 12 and a central spring 14 is disposed in the element 10 according to FIGS. 4 to 7, the assembly being introduced in the bore of the element 3 by its side penetrating into the cone 1 and the element 10 is presented such that the ball housed in the radial bore 22 cooperates with one of the longitudinal indexing grooves 21, by presenting the recesses 25 for disengagement of the balls 9 facing the openings 12 of the part 3. Then, the element 6 is screwed and blocked in the front part 3 and the mounting element 33 is screwed in the element 6, its screw 35 next being displaced in the direction of the element 10 so as to push this latter to the base of its housing in the front part 3 against the abutment 17.

The elastic unit 7 formed by Belleville washers is then introduced into the cone 1 and the balls 9 are introduced into the openings 12 of the part 3, this latter being next introduced into the cone 1 with indexing with respect to this latter through the intermediary of its pin 31 cooperating with the corresponding housing 32 provided in the flange 4 of the part 3, an operating play, taking account of the tolerances in the length of the existing cones and spindles and a supplementary gripping margin, being maintained between the front face of the cone 1 and the rear face of the flange 4.

The mounting element 33 may then be retracted and a key may be introduced into the polygonal recess 37 of the element 10 to effect a rotation of this latter adapted to conduct the indexing ball to engage itself in the following groove 21 and thus to release the balls 9 from the corresponding recesses 25 of the frusto-conical part 11. Next, the knob 5 may be screwed into the element 6 until it arrives against the stopping abutment 27 of this latter, thus effecting a preliminary gripping between the cone 1 and the front part 3 while maintaining a play between the face of the cone 1 and that of the front part 3, this play being necessary for proper operation at the time of application by the gripper of the machine of the rear face of the flange 4 against the face of the spindle 2.

The mounting device may then be introduced manually or automatically into the spindle of the machine, its cone 1 being applied, at the time of the initial gripping phase, in the cone of the spindle 2 by means of the knob 5 acted on by the gripper, a complementary actuation resulting in application of the rear face of the flange 4 against the front face of the spindle 2. In the course of this gripping action, the balls 9 are gripped between several elements having different angular inclinations, such that there is effected, by the element 10 whose frusto-conical part 11 has a lesser slope, a locking in service position of these elements.

Thus, after effecting adjustment in the spindle of the machine and application against the front face of the spindle, the principal constituent elements of the device behave as if the device were formed in a single piece, locking of the elements to one another being extremely efficient. The device may then remain positively locked for a use on the spindle having served for its adjustment, each remounting on the said spindle resulting in an application in the cone and against the face.

In the case where the device is to be used on another machine, it is sufficient to unlock the assembly between the cone 1 and the part 3 by exerting a pressure on the element 10 by means of the screw 36 housed in the knob 5 so as to free the balls 9. A mounting in another spindle followed by a gripping in this latter will permit an automatic adjustment of the device in the said spindle.

The operation of the device has been described with reference to an element 10 provided with a single housing 15 cooperating with a front part according to FIG. 2. Nevertheless, other combinations of elements 10 and front parts 3 are possible without altering the operation of the device.

Thanks to the invention, it is possible to provide a mounting device for attachments, toolholders and tools with cone-to-surface application, especially for machining and tooling centers with automatic or manual conical-shanked toolholders, particularly with a 7/24ths cone, permitting a cone-to-surface application and a persistence of a given adjustment for use on a given machine, while remaining easily adaptable to a spindle of another machine.

It will be understood that the invention is not limited to the embodiment described and shown in the accompanying drawings. Modifications remain possible, especially from the point of view of the constitution of the various elements or by substitution of equivalent techniques, without departing whatsoever from the scope of protection of the invention.

I claim:

1. Mounting device with conical shank, particularly a 7/24ths cone, for cone-to-surface application for attachments, toolholders and tools, essentially constituted by a cone (1) for mounting in spindle (2), by a front part (3) having a portion thereof centered in the cone (1) and provided with a flange (4) for application via its rear face against the front face of the spindle (2), and by a knob (5) connecting for assembly the cone (1) and the front part (3) by means of an intermediate threaded element (6), on which bears an elastic unit (7) formed of Belleville washers intended to apply the cone (1) into the spindle (2) in locking position and mounted in compression between the said cone (1) and the front part (3), characterized in that between the cone and said portion is provided a device (8) for locking the mutual position of the cone (1) and the front part (3), in mounting position in the spindle (2) with application of the flange (4) against the face of the said spindle (2), by gripping at least two balls (9) between the said cone (1) and front part (3).

2. Device according to claim 1, characterized in that the device (8) for locking of the mutual position of the cone (1) and the front part (3) is advantageously constituted by a cylindrical locking element (10) housed in the front part (3), directed toward the knob (5) and having a frusto-conical portion (11) cooperating with at least two balls (9), preferably three balls (9), on the side directed toward the knob (5), the said balls (9) being positioned at regular intervals in openings (12) of the front part (3) and cooperating with corresponding housings (13) or a corresponding circular channel of the cone (1), the said element (10) being urged by at least one spring (14) disposed in at least one housing (15) of its rear part and maintained in the said housing by means of a closing cover (16) or an abutment (17 or 18) for adjusting the pressure of the spring or springs.

3. Device according to claim 1, characterized in that the balls (9) are provided in a large number and cooperate with a corresponding number of housings (13) or with a circular channel of the cone (1).

4. Device according to claim 2, characterized in that the locking element (10) is provided with a single housing (15) for receiving a single spring (14) or several housings (19) disposed in a barrel for receiving several springs (20).

5. Device according to claim 2, characterized in that the locking element (10) is additionally provided, on the one hand, on its cylindrical part at regular intervals of preferably 60°, with longitudinal indexing grooves (21) intended to cooperate with a ball housed in a radial bore (22) of the front part (3), at the level of the flange (4) and in the middle of the groove (23) of this latter and urged by a spring of which the force is adjusted by means of a screw received in an end threading (24) of the bore (22) and, on the other hand, on its frusto-conical part (11), at regular intervals of preferably 120°, with recesses (25) for releasing the balls (9) at the time of mounting the device.

6. Device according to claim 2, characterized in that the frusto-conical portion (11) of the locking element (10) is provided at regular intervals and preferably between the recesses (25), with longitudinal grooves (26) having a spherical base, the radius of curvature of which is equal to the radius of the balls (9).

7. Device according to claim 1, characterized in that the intermediate threaded element (6) is advantageously provided, at the end of its interval housing directed toward the locking element (10), with a stopping abutment (27) for the knob (5), in the form of an elastic sleeve penetrating into a circular channel provided at the end of the said housing.

8. Device according to claim 2, characterized in that the abutments (17 and 18) for adjusting the pressure of the single spring (14) or the multiple springs (20) are intended to be introduced, in the case of the abutment (17) in a housing (28) of the front part (3) for displaceable adjustment by means of a screw cooperating with a tapping (29) of this front part (3), provided on the side opposite the housing of the element (10), and in the case of the other abutment (18) in a tapping (30) of the front part (3), extending the housing of the element (10) on the side opposite the knob (5).

9. Device according to claim 1-, characterized in that the cone (1) is provided on its front directed toward the front part (3) with a pin (31) intended to cooperate with a correspondingly-shaped housing (32) of the flange (4) of the front part (3) to provide a mutual indexing permitting alignment of the windows (12) of the part (3) and the corresponding housings (13) of the cone (1).

10. Device according to claim 1, characterized in that, to promote mounting of the front part (3) with the locking device (8) in the cone (1), the device according to the invention is provided with a mounting element (33) provided at one end of a threading (34) intended to cooperate with the tapping of the intermediate threaded portion (6) and receiving a screw (35) for actuating the locking element (10).

11. Device according to claim 1, characterized in that the knob (5) is a hollow knob provided at its end screwed in the threaded element (6) with an interior manipulating screw (36).

12. Device according to claim 2, characterized in that the locking element (10) is advantageously provided on its face directed toward the knob (5) with a polygonal manipulating recess (37).

13. Device according to claim 1, characterized in that the intermediate element (6) is eliminated, the knob (5) having a greater diameter and being screwed directly into the bore of the element (3), of which the diameter is lesser, the assembly (8) having an exterior diameter corresponding to that of the bore of the element (3) and the balls (9) having a greater diameter.

* * * * *